United States Patent
Thomas et al.

(10) Patent No.: US 9,509,573 B2
(45) Date of Patent: Nov. 29, 2016

(54) FEDERATION FOR INFORMATION TECHNOLOGY SERVICE MANAGEMENT

(75) Inventors: Jeffery Darrel Thomas, Plano, TX (US); Jamie Erbes, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 128 days.

(21) Appl. No.: 14/234,673

(22) PCT Filed: Aug. 4, 2011

(86) PCT No.: PCT/US2011/046607
§ 371 (c)(1),
(2), (4) Date: Jan. 24, 2014

(87) PCT Pub. No.: WO2013/019241
PCT Pub. Date: Feb. 7, 2013

(65) Prior Publication Data
US 2014/0181255 A1    Jun. 26, 2014

(51) Int. Cl.
*H04L 12/24* (2006.01)
*G06F 9/50* (2006.01)

(52) U.S. Cl.
CPC ......... *H04L 41/5054* (2013.01); *G06F 9/5072* (2013.01); *G06F 9/5077* (2013.01); *H04L 41/18* (2013.01); *H04L 41/5064* (2013.01)

(58) Field of Classification Search
CPC  G06Q 10/00; G06Q 10/109; H04L 12/2801; H04L 12/2803; H04L 12/2825; H04L 12/5815; H04L 45/00; H04L 63/0884; H04L 67/2838; H04L 41/5054; H04L 41/18; H04L 41/5064; H04M 11/062; H04W 4/001; G06F 9/5072; G06F 9/5077
See application file for complete search history.

(56) References Cited

U.S. PATENT DOCUMENTS

| | | | | |
|---|---|---|---|---|
| 6,564,056 B1 * | 5/2003 | Fitzgerald | ........... | H04L 12/2803 340/5.1 |
| 8,054,780 B1 * | 11/2011 | Manroa | ................. | H04W 4/001 370/328 |
| 2002/0021675 A1 * | 2/2002 | Feldmann | ............... | H04L 45/00 370/254 |
| 2002/0191557 A1 * | 12/2002 | Chow | ................. | H04L 12/2801 370/329 |
| 2005/0021638 A1 * | 1/2005 | Caldini | ................ | G06Q 10/109 709/206 |
| 2006/0193313 A1 * | 8/2006 | Landry | ................ | H04M 11/062 370/365 |
| 2007/0150480 A1 * | 6/2007 | Hwang | .................. | G06Q 10/00 |
| 2008/0162637 A1 * | 7/2008 | Adamczyk | .......... | H04L 12/5815 709/204 |
| 2009/0100492 A1 * | 4/2009 | Hicks, III | ........... | H04L 12/2825 725/127 |
| 2009/0172025 A1 | 7/2009 | Ristock | | |
| 2009/0178109 A1 | 7/2009 | Nice et al. | | |
| 2009/0193057 A1 * | 7/2009 | Maes | .................. | H04L 67/2838 |
| 2010/0064033 A1 | 3/2010 | Travostino et al. | | |
| 2010/0161759 A1 | 6/2010 | Brand | | |
| 2010/0185658 A1 | 7/2010 | Kowalski | | |
| 2010/0274982 A1 | 10/2010 | Mehr et al. | | |

(Continued)

OTHER PUBLICATIONS

Cisco Cloud Enablement Services; 2010. pp. 1-7. http://www.cisco.com/en/US/services/ps2961/ps10364/ps10370/ps11104/services_cloud_.

(Continued)

*Primary Examiner* — Le Luu
(74) *Attorney, Agent, or Firm* — Mannava & Kang, P.C.

(57) ABSTRACT

Federation systems and methods for information technology service management are disclosed. An example method includes interfacing with each of the autonomous operational models. The method also includes providing a single point of access for client visibility across each of the autonomous operational models.

15 Claims, 4 Drawing Sheets

(56) References Cited

U.S. PATENT DOCUMENTS

2011/0153727 A1 6/2011 Li
2011/0277027 A1* 11/2011 Hayton ............... H04L 63/0884
726/8

OTHER PUBLICATIONS

PCT; "Notification of Transmittal of the International Search Report and the Written Opinion of the International Searching Authority, or the Declaration"; for PCT/US2011/046607: mailed Apr. 27, 2012: 9 pages.
Private Cloud Computing for Enterprises: Meet the Demands of High Utilization and Rapid Change, 2009. pp. 1-13 http//cisco.com/en/US/solutions/collateral/ns340/ns517/ns224/ns836/ns976/white_paper_c11-543729.html.
Cisco, "Introduction to eTOM", White Paper, 2009 Cisco Systems, Inc., 13 pages.
IBM Corporation, "Service Management Foundation, From Best Practice to Implementation", 2008 IBM Corporation, 34 pages.

* cited by examiner

FEDERATION FOR INFORMATION TECHNOLOGY SERVICE MANAGEMENT

BACKGROUND

The client/server computing environment continues to expand into web services, with the latest iteration of network supported programmatic access to services and data provided by many service providers. Traditionally, applications have been fairly static in nature. But as information technology (IT) infrastructure has both grown in capability and functionality, IT service providers are moving to viable service provider platforms that are highly adaptive, readily prototyped, and readily scaled through hosted web services, such as the so-called "cloud" computing environment.

Service providers have focused on service integration in the traditional space, such as the practice of providing service management functionality to large enterprises by sourcing transformation-based infrastructure. But there is little, if anything available for interfacing the various platforms.

For example, telecommunications service providers have implemented the Enhanced Telecom Operations Map (eTOM) industry standard service management process framework to manage both their own and their client's web-based environments. But these providers have not implemented cross-functionality outside of these types of models.

IT service providers have implemented service management stacks based on the Information Technology Infrastructure Library (ITIL). But these are primarily manually-driven systems Others have implemented traditional service integration models, but have not extended these models to comprehend non-traditional environments such as cloud-based computing, web-hosted environments, and other managed services.

Cloud providers have implemented a level of infrastructure technology service management as lightweight single-task processes, such as watchdog services that provide simple monitoring, and other simple availability services. But these do not prove full functionality and lack dynamic provider-driven, multi-client processing, and therefore provide little benefit to traditional systems.

Other providers have implemented so-called "bolt-on" cloud control products, which provide services to control cloud operational models. However, each user has to instantiate their own separate instance of the model to control their own service.

DETAILED DESCRIPTION

Federation systems and methods are disclosed for information technology service management (ITSM). In an example, the federation system includes an integration layer to provide interoperability among autonomous operational models for a client infrastructure. A client interface provides single point of access visibility across each of the different operational models. The federation is flexible and compliant with multiple service management models, supports a variety of interface types, and can be implemented across multiple platforms and providers, or as part of a single client, multiple-view model for use by an enterprise to have an overall view of the IT infrastructure.

Accordingly, the systems and methods disclosed herein may be used to provide interoperable information technology service management among a variety of different platforms (e.g., cloud-to-traditional platforms). The federation also enables the cloud and traditional IT infrastructure to use ITSM as a bridge for end-to-end coherency. By way of illustration, the federation may be used to give a client an overview of the various components of their IT infrastructure when changing or adding a component to the infrastructure.

Before continuing, it is noted that as used herein, the term "includes" and "including" means, but is not limited to meaning, "includes" or "including" and "includes at least" or "including at least." The term "based on" means "based on" and "based at least in part on."

Figure 1:
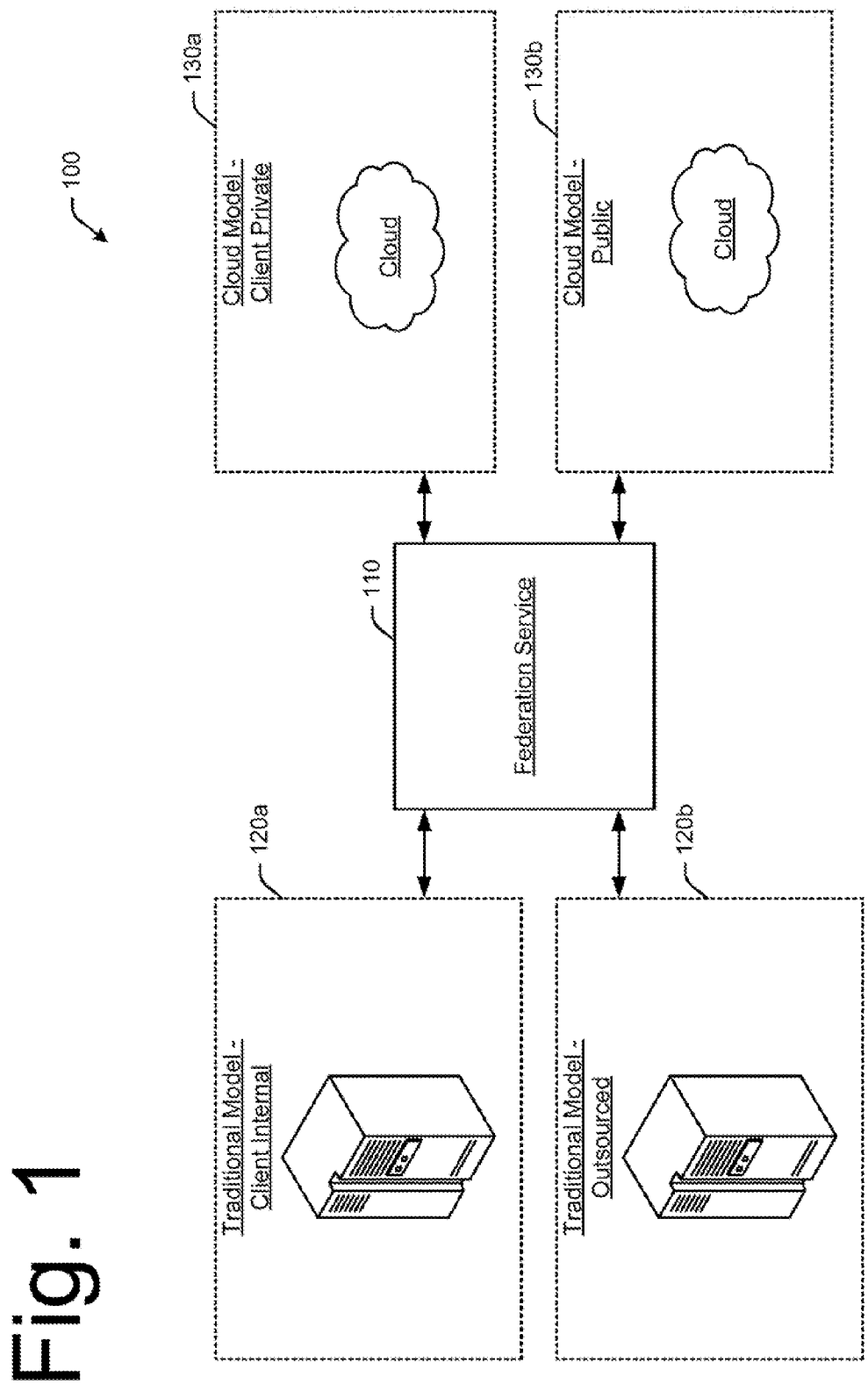
FIG. 1 is a high-level block diagram of an example networked computer system which may implement a federation service for information technology service management.

FIG. 1 is a high-level block diagram of an example networked computer system 100 which may implement a federation service 110 for information technology service management. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

The system 100 may also include suitable communication networks, such as a local area network (LAN) and/or wide area network (WAN). The network may also provide accessibility for the federation service 110 to the various infrastructure installations. The federation service 110 described herein may be provided on the network via a suitable communication connection, such as via an Internet service provider (ISP). In this regard, the federation service 110 is able to access infrastructure directly via the network, or via an agent, such as another network.

IT infrastructure may be provided by any suitable computer or computing devices capable of implementing the IT services for an enterprise. The infrastructure is not limited to provision by any particular type of devices. Although, it is noted that the operations described herein may be executed by program code residing on a computer system having sufficient processing capability, such as a server computer or plurality of server computers on a network for a client.

In an example, the system 100 may include both traditional infrastructure 120a-b, and cloud-based infrastructure 130a-b. Traditional infrastructure may be provided in-house by the client (illustrated by 120a), and/or may be outsourced to a third party (as illustrated by 120b). Similarly, the cloud-based infrastructure may be a private cloud (as illustrated by 130a), and/or may be provided by as part of a public cloud (as illustrated by 130b).

Cloud computing and its tenets of a hyper-automated, hypo-touch (i.e., minimal human operational control) construct has caused a disruptive shift in IT services. As a result, cloud computing has created a new operational model for corporate enterprises, both for the corporate structure and IT departments that implement a cloud model. Cloud computing has also created a new operational model for IT service providers that create multi-client operational models and instantiate hosting services for other enterprises to access. This new methodology and model is a stark contrast to the existing enterprise models and their highly manual, elementally segmented (by hardware and software towers), and associated disjointed IT management approaches.

An IT operational model is the ecosystem that provides the standard framework, architecture, tools, continually refreshing technology components, continual process flow of work within, and people alignment to provide IT services. As new operational models have formed in place of existing IT operational models, concise best practices have been created to harness the layers of a reference cloud operational model. Example best practices include, but are not limited to, infrastructure as a service (IaaS), platform as a service (PaaS), and software as a service (SaaS).

Infrastructure as a service (IaaS) provides the foundational access to pools of computing, storage, and networking resources in physical and/or virtual form. Resources are exposed to allow clients to provision these resources for their own IT purposes. Infrastructure as a service is highly automated, and used for many enterprise infrastructure needs.

Platform as a service (PaaS) provides the next layer in the standard cloud operational model. Platform as a service is designed to allow application-level capabilities for clients of the cloud. Application-level capabilities include the abstraction of application platform-oriented development tools, and/or platform-oriented application instantiation methodologies and tools to operate on top of the infrastructure layer of a cloud environment.

Software as a service (SaaS) provides the actual application that is created to run as a custom cloud service using web-based application tenets. Software as a service may also use the infrastructure as a service layer to run the service, and the platform as a service layer to develop and/or deploy the service for execution and usage by the software as a service clients.

In each of these layers, a management base enable operations, automation, and handling the lifecycle of technology in the respective domain. For example, infrastructure as a service may provide element automation management. That is, the ability to dynamically manage the lifecycle of servers, storage, networking, virtualized resources, and even off-the-shelf applications within the infrastructure layer. In platform as a service, management includes the ability to instantiate complex infrastructure as a service to application relationships for deployment. Management may also include development management functionality to simplify the instantiation of software as a service on a cloud infrastructure as a service layer for continual operation and respective automation by elemental automation functions and processes.

The cloud and its operational model relies on best practices. These best practices have become the staple of visibility for enterprise businesses into IT operations, and include various processes. These processes may include, but are not limited to, security management, service level agreements, configuration management capacity management, event management, and continuity management.

Security management is the creation or exposure of security policy, security best practices and industry controls, but in a cloud-oriented manner. Service level agreements provide the ability to measure and act on client-oriented requests as confronted during the operation of a client cloud service.

Configuration management includes an active prescriptive model of holding reusable configuration items that represent readily automated components of elemental and complex IT components.

Capacity management is a component of applying a usage-based, scaled, and aggregation of chargeback data for a cloud and its operational model. Capacity management within a cloud operational model is more dynamic than when used in traditional IT enterprise architecture.

Event management is the integration of monitoring and metering data from hardware, software, applications and services running within IT environments. Event management is provided in the context of running services, rapidly exposing monitored data and responding to incidents and problems in relationship to policy-driven remediation. As used herein, event management is an enhanced combination of incident and problem management, and also includes positive events that are to be acted on in the service layer.

Continuity management becomes an ingrained part of the overall running model as cloud services scale up and down, or recover dynamically from failure through automation. Continuity management is designed in a manner which allows rapid recovery, and is proactive (e.g., threshold-driven), to accommodate entity loss and preserve service integrity. This is regardless of whether locally or geographically providing continuity management functionality.

The cloud operational models may institute lightweight versions of these processes as best practices, allowing clients and services to either use front-end service management functionality as lightweight, client segmented technologies. The cloud operational model may also itself support engrained, lightweight ITSM services for multiple client usage.

However, clients may have services that operate both in the cloud and outside of the cloud. The client may operate these services using an internal IT department (illustrated in FIG. 1 by reference 120a), using a traditional IT service provider (reference 120b), using a private cloud service (reference 130a), and/or using a cloud service provider that manages these services on behalf of the client (reference 130b). Many enterprises have different instantiations or portions of systems and processes. These constructs lead to enterprises having disparate, legacy-based, and non-automated IT environments. In the absence of intrinsic service management, users of cloud service and service providers may use third party front-end tools to provide their own individual management needs. Such a hybrid approach needs to be managed in a cohesive and consistent manner.

The systems and methods disclosed herein support a federation operational model for providing ITSM. The federation has the ability to support client needs in the various sourcing spaces selected by the client. The federation also provides visibility and transparency across each platform. Accordingly, the federation provides a high level of visibility, transparency, operational excellence, and business-to-IT alignment.

By way of illustration, a client may choose to source services to a cloud-based model 130a-b, and/or consume services from the cloud-based model 130a-b, while in parallel providing and/or consuming services from a traditional IT enterprise model 120a-b. The traditional model 120a-b is operated with existing processes, including some manual and some that are over a decade old. For example, the traditional model 120a-b may include a server, mainframe, and legacy applications. The enterprise may rely on traditional management (in-house and/or outsourced) to provide IT services for the traditional model 120a-b. While on the cloud model 130a-b, service may be provided using either front-end processing tools or even an integrated cloud service stack.

In this illustration, the client has services and applications running in both traditional and cloud-based models. In many cases, these models are incompatible, processing against each other as an end-to-end system. Meanwhile, the enterprise desires business to IT visibility for all services, both traditional and cloud-based.

The federation service 110 disclosed herein may be utilized to interface between the multiple infrastructure platforms by aggregating these multiple, discrete, and/or autonomous models into a single process-to-process federation service 110. The federation service 110 "cross-wires" various ITSM functions in the traditional and cloud-based infrastructures, while still allowing the client to differentiate and benefit from using both cloud and traditional enterprise models. The federation service 110 also provides a reusable, standardized approach.

Figure 2:
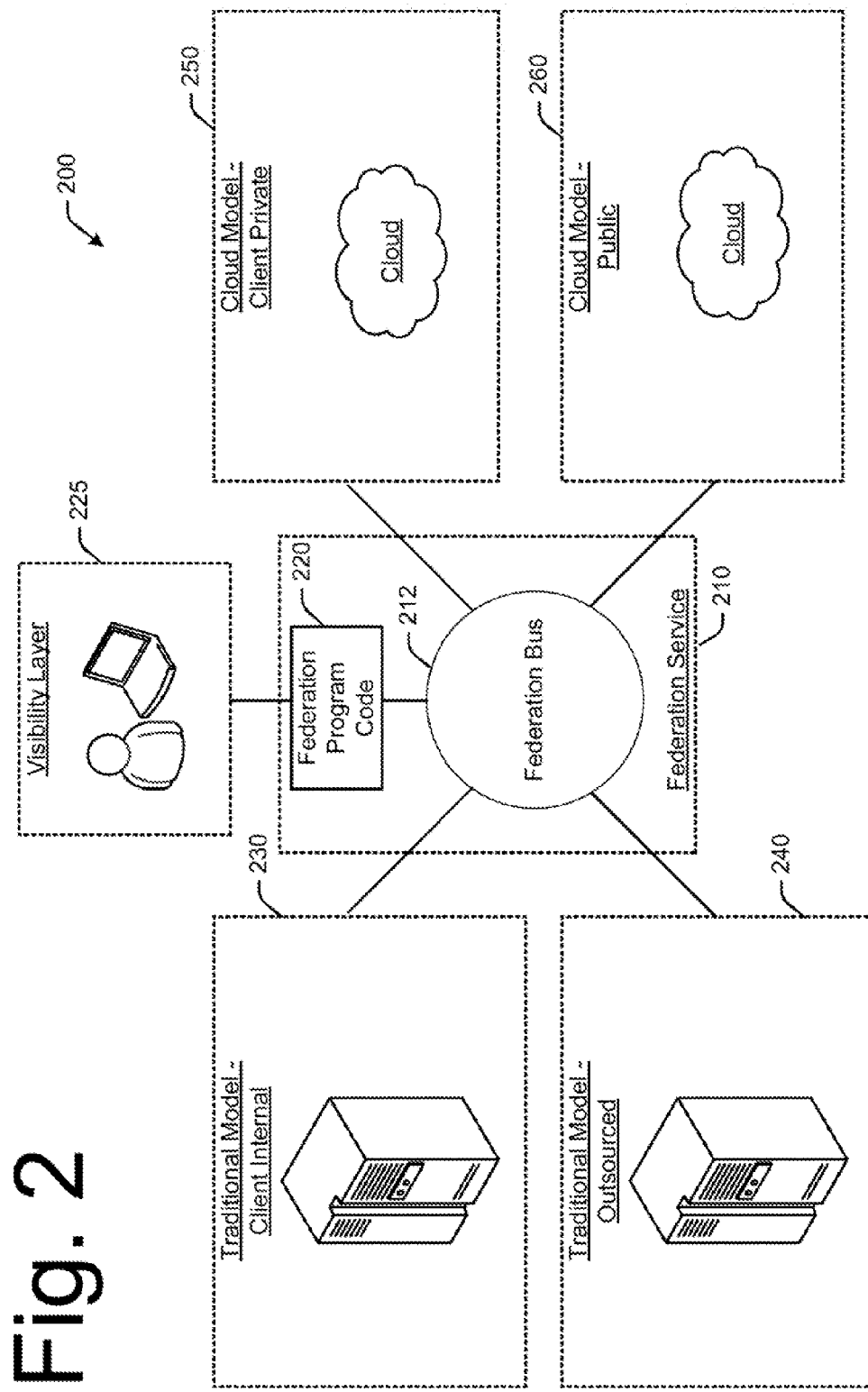
FIG. 2 shows a reference model for implementing a federation service between multiple enterprise and provider-based sourcing permutations.

FIG. 2 shows a reference model 200 for implementing a federation service 210 between multiple enterprise and provider-based sourcing permutations. In the example shown in FIG. 2, the federation service 210 is shown in more detail as it may be utilized to provide traditional-to-cloud functionality for an enterprise. A software-implementable structure (program code 220) supports inter-process flows between the cloud and traditional IT process flow models. The federation service 210 provides support for discrete process-to-process, and full process framework-to-process federation flows.

The federation service 210 may support multiple service provider interconnects based on enterprise and/or service provider instantiation needs. The federation service 210 may support access therebetween via various programmatic and/or data transport models. These models may include, for example, Web Services (e.g., REST/SOAP-based protocols), application programming interfaces (APIs) for proprietary implementations (e.g., CLI, XML and derivatives). In addition, the provider and/or client can implement a viability layer in portal, user interface (UI), or exposed programmatic interfaces to a third party portal.

In an example, the federation service 210 may provide ITSM-to-ITSM process flow. That is, the federation service 210 may be based on a provider or enterprise cloud operational model, and interface to another ITSM model (e.g., traditional, private internal cloud, or third party ITSM provider such as a service integrator), and/or to a third party or client internal traditional ITSM process framework. The federation service 210 may also provide discrete or composite ITSM process flow to facilitate individual ITSM-to-ITSM process flow data. The federation may also provide full ITSM process framework for system-to-system flow.

In an example, the federation service 210 supports standardized data expressions and metadata commensurate with the needs of a provider and the provider's clients, or an enterprise and the various sourced customer interfaces. The federation service 210 may also facilitate communications via provider-to-provider, client-to-provider, intra-provider (e.g., a provider sourcing multiple types of packages for a client), intra-provider-to-client (e.g., two or more provider sourced and internal client interconnected services), and/or third party provider-to-third party provider-to-client sourced services.

The federation service 210 may also support real-time data process transport in either proprietary or standardized data interfaces. For example, interfaces may be provided to support standard (e.g., ITIL-based or eTOM-based) enterprise architecture interactions. For example, enterprises that have implemented standard architecture process frameworks can interact within the federation model.

The federation service 210 is also flexible and can handle various enterprise and service provider implementations. The methodology may be utilized by an enterprise that creates its own federation model. The methodology may also be utilized by service providers that implement the federation for multiple clients within its own ecosystem and sourcing offerings.

In the example shown in FIG. 2, the client has an established service layer within a corporate enterprise 230 (e.g., using ITIL, eTOM, or combination of permuted process functionality from derivatives or relative representations thereof). As such, the client implements typical processes (e.g., problem, incident, change, and configuration) or higher level functions (e.g., capacity, continuity, and security) to manage internal IT and provide business-to-IT coherency.

Additionally, the enterprise may have outsourced a portion (or all of the IT environment) to an IT service provider 240, or even to multiple IT service providers (referred to herein as "multi-sourcing"). The provider(s) 240 may also provide service management functions for the sourced components on behalf of the enterprise. The IT service providers 240 may operate a traditional service model that is implemented for multiple clients, and may have multiple service interfaces for their clients which include the enterprise's sourced components. Also in this example, the IT service providers may use primarily manual practices due to the nature of the traditional sourcing model (e.g., highly non-standardized, transformational) because the nature of partial sourcing models inhibit automated services.

The client may also desire to establish a private dedicated cloud 250 (implemented solely for the client). The client may implement processes integral to the private cloud model. For example, the client may have acquired a vendor package that is implemented within the enterprise. The client may also have architected a set of processes and implemented those processes using infrastructure as a service, platform as a service and/or other layers converged or as a combination thereof.

A third party cloud service provider may also offer the enterprise cloud services 260, along with an intrinsic service model that is cloud-ready. This cloud model may operate at a higher automation and standardization rate than a traditional IT operations model, and even the private cloud 250. That is, the model is "multi-tenant," offering service management for multiple client services simultaneously for other clients. Therefore, the federation service 210 needs to understand the dynamic interaction between management layers and business reporting layers as well.

It can be seen by the example described above with reference to FIG. 2, that the client can have varying permutations in sourcing requirements. To summarize, the client in this example has sourced an IT environment 240 to a traditional IT provider, and sourced cloud 260 needs via another (e.g., public) IT provider. The client also has a traditional IT environment 230 on site, while also running a private dedicated cloud model 250. The federation bus 212 provides interoperability among the different models, by aggregating output via the federation program code 220 for output to a user at a visibility layer 225.

In other example, the client may source an IT environment to multiple traditional IT providers, and source cloud needs to other IT provider(s) that offer cloud services. The client may also source an IT environment to several traditional IT providers, where at least one of those providers creates/runs a private dedicated cloud, and sources go-to-market software as a service to another provider (or one of the traditional IT providers that also offers cloud services).

These and other examples, are all in line with existing scenarios in the IT industry at present, and will continue to be emerging scenarios with the addition of the cloud. The program code described herein may be used to manage these and other scenarios. An example of the program code can be better understood with reference to FIG. 3 and the following discussion of various example functions of the federation system. However, the operations described herein are not limited to any specific implementation with any particular type of program code.

Figure 3:
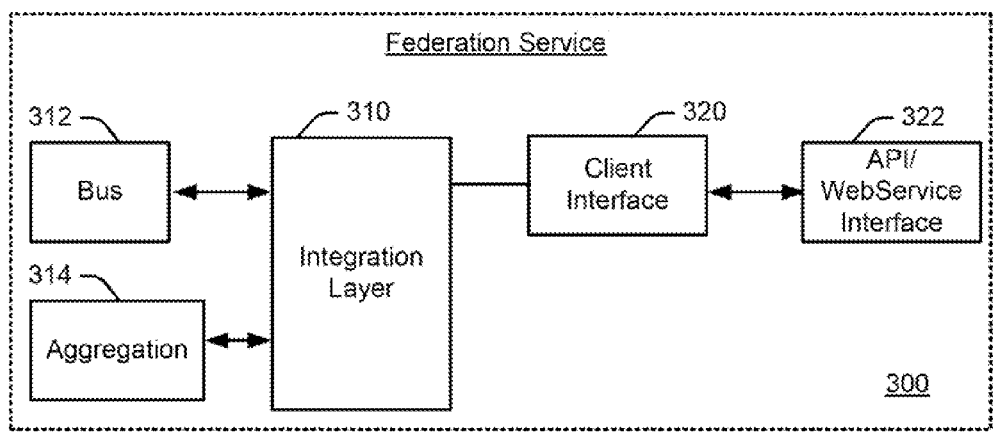
FIG. 3 shows example architecture of machine readable instructions which may execute program code to implement a federation service.

FIG. 3 shows an example architecture 300 of machine readable instructions which may be executed to implement a federation service. In an example, the program code may be implemented in machine-readable instructions (such as but not limited to, software or firmware). The machine-readable instructions may be stored on a non-transient computer readable medium and are executable by one or more processor to perform the operations described herein. It is noted, however, that the components shown herein are provided only for purposes of illustration of an example operating environment, and are not intended to limit implementation to any particular system.

The program code executes the function of the architecture of machine readable instructions as self-contained modules. These modules can be integrated within a self-standing tool, or may be implemented as agents that run on top of an existing program code. In an example, the architecture of machine readable instructions may include an integration layer 310 to provide interoperability and an orchestration engine among autonomous operational models for a client infrastructure. The machine readable instructions may also include a client interface 320 to provide single point of access visibility across each of the different operational models.

The integration layer 310 may include a poly-ITSM federation bus 312. In an example, the federation bus 312 is implemented to pass data bi-directionally within the cloud model between various ITSM processes and frameworks. An orchestration model may be deployed by the federation bus 312 to orchestrate data and process flows throughout the functions in real-time. The federation bus 312 may be lightweight and enable fast ITSM functions, commensurate with discrete processes (e.g., configuration management-to-configuration management, event management-to-problem, incident management, and capacity management-to-capacity management). The federation bus 312 may also enable composite process framework mapping (e.g., full client-specific ITSM data flow from subordinate framework systems in the ecosystem to the omniscient ITSM at the ultimate client visibility layer).

The integration layer 310 may also include a federation aggregation layer 314 connected to, or extended from, the federation bus 312 exposure and data flows. In an example, the federation aggregation layer 314 may be implemented as a portal, user interface, or Web Service. The federation aggregation layer 314 can be implemented in the program code by a service provider, enterprise, and/or may be created by an independent software vendor as a sold package.

It is noted that the federation aggregation layer 314 may operate in native formats. That is, the federation aggregation layer 314 interoperates with the intersection of workflows for the various autonomous operational modules for the client infrastructure, and the underpinning data, but without having to translate processes and communications of each of the autonomous operational modules into any particular format or business defined steps for output to the client.

The client interface 320 may be implemented as an API-based interface, and provides integrated views into all the forms of data from the federation. The client interface 320 provides ITSM data correlation based on the associated data from an ITSM providing source. The correlation may be a single process that represents service management data from an end-to-end service hosted by multiple different providers. For example, event management process dataflow from software as a service may be sourced by a third party cloud provider coupled with the event management dataflow from a backend system, which in turn is sourced by a traditional IT provider. In another example, a full service management process flow feeds from a third party provider performing the federation on behalf of the client.

The client interface 320 may include a Northbound/Southbound API/Web Service interface 322. The interface 322 establishes electronic API and Web Service interfaces into the federation model. The interface 322 also exposes programmatic and data flow functions to the client and other providers in the federation.

For purposes of illustration, client-to-federation interactions may include the client shown in FIG. 2, having an outsourcing arrangement with a traditional IT service provider, a cloud IT provider, and/or an in-house IT department. In addition, the client may utilize a private-dedicated cloud operational model to service corporate and interdepartmental needs.

The program code shown in FIG. 3 may be interoperable with each model via an associated ITSM. In an example, the traditional IT provider may use a multi-client ITSM for transformational IT outsourcing, and the technology services the client has contracted for. The cloud IT provider uses intrinsic services for the client's cloud sourcing needs, such as a software as a service or scalable compute and storage infrastructure as a service resources. The client has an internal ITSM that is managing a large portion of the IT environment, established using the ITIL process framework. The client may also utilize rudimentary functions for a private cloud model, such as monitoring, change management, capacity management for scaling, and chargeback services for department usage.

In this example, the federation model is implemented between the operational model instantiations, providing the client visibility across all models. The client has direct visibility from any of the models individually as the models each provide direct ITSM access via a portal or Web Service API). Accordingly, the client has visibility into the lifecycle operations of the various direct models.

The client can also use the federation model for end-to-end visibility between the models, to services that span across the models. For example, the software as a service may process transactions from a traditional model system housed in the client's outsourced environment or internal environment. Such visibility provided by the federation provides the client a macro view of the services being operated, as the services are processed.

It is noted that the client can use the federation system to change infrastructure. For purposes of illustration, the federation may determine what needs to happen to effect a change, and each autonomous operational model feeds back to the federation system for determining how to effect the change. The federation system may report to the client what is done, and what still has to be done (e.g., which protocols, datatypes, and interconnections are modified for the change), so that the multiple autonomous operational models will continue to work together in the client infrastructure. The federation system may also analyze sourcing relations, hierarchies, and applications, to name only a few examples.

Still other examples are also contemplated. The systems and methods described herein are not limited to any particular infrastructure(s) and may be utilized with infrastructures, and/or components thereof, which are now known or are later developed.

Before continuing, it should be noted that the examples described above are provided for purposes of illustration, and are not intended to be limiting. Other devices and/or device configurations may be utilized to carry out the operations described herein.

Figure 4:
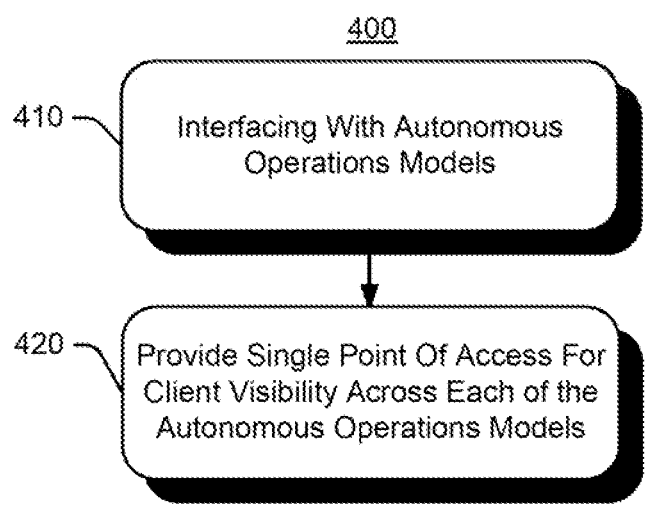
FIG. 4 is a flowchart illustrating example operations which may be implemented by a federation service.

FIG. 4 is a flowchart illustrating example operations which may be implemented by a federation service. Operations 400 may he embodied as logic instructions on one or more non-transient computer-readable medium. When executed on a processor, the logic instructions cause a general purpose computing device to be programmed as a special-purpose machine that implements the described operations. In an example implementation, the components and connections depicted in the figures may be used.

Operation 410 includes interfacing with each of the autonomous operational models. The autonomous operational models have independent information technology service providers. Operation 430 includes providing a single point of access for client visibility across each of the different operational models.

The operations shown and described herein are provided to illustrate various implementations. It is noted that the operations are not limited to the ordering shown. Still other operations may also be implemented.

Further operations may include providing end-to-end visibility between the autonomous operational models to services spanning across the autonomous operational models. Further operations may also include providing a viability layer to a third-party portal.

In addition, further support operations may be provided. Example operations may include supporting various supporting inter-process flow across the autonomous operational models, supporting multiple service provider interconnects for the autonomous operational models. Example operations may include supporting different programmatic and data transport platforms for the autonomous operational models. Example operations may include supporting process-to-process flows for the autonomous operational models. Example operations may include supporting full process framework-to-process flows for the autonomous operational models. Examples operations may include supporting multi-provider interconnects for the autonomous operational models.

It is noted that in an example, the operations may be implemented at least in part using an end-user interface (e.g., web-based interface). The end-user is able to make predetermined selections, and the operations described above are implemented on a back-end device to present results to a user. The user can then make further selections. It is also noted that various of the operations described herein may be automated or partially automated.

The example embodiments shown and described are provided for purposes of illustration and are not intended to be limiting. Still other embodiments are also contemplated.

The invention claimed is:

1. A federation method for information technology service management, the method comprising:
    interfacing with each of autonomous operational models for a client infrastructure, the autonomous operational models having independent information technology service providers;
    providing, on a client interface, a single point of access visibility across the autonomous operational models;
    changing the client infrastructure in response to a change command and feedback from the autonomous operational models; and
    reporting, on the client interface, changes that have been made on the client infrastructure and changes that need to be done.

2. The method of claim 1, further comprising providing end-to-end visibility between the autonomous operational models to services spanning across the autonomous operational models.

3. The method of claim 1, further comprising supporting inter-process flow across the autonomous operational models.

4. The method of claim 1, further comprising supporting multiple service provider interconnects for the autonomous operational models.

5. The method of claim 1, further comprising supporting different programmatic and data transport platforms for the autonomous operational models.

6. The method of claim 1, further comprising supporting process-to-process flows for the autonomous operational models.

7. The method of claim 1, further comprising supporting full process framework-to-process flows for the autonomous operational models.

8. The method of claim 1, further comprising supporting multi-provider interconnects for the autonomous operational models.

9. The method of claim 7, further comprising providing a viability layer to a third-party portal.

10. A federation system for information technology service management, the system comprising:
    an integration layer to provide interoperability among autonomous operational models for a client infrastructure, the autonomous operational models having independent information technology service providers;
    a client interface to provide single point of access visibility across the autonomous operational models and to show a report of changes that have been made to the client infrastructure and changes that need to be done; and
    a processor to change the client infrastructure in response to a change command and feedback from the autonomous operational models.

11. The system of claim 10, wherein the integration layer has a federation bus to pass data bidirectionally between the autonomous operational models.

12. The system of claim 10, wherein the integration layer has an aggregation layer to provide integrated views into all forms of data from the autonomous operational models.

13. The system of claim 10, wherein the client interface provides visibility into lifecycle operations of the autonomous operational models.

14. The system of claim 10, further comprising northbound/southbound API/Web Services interfaces to establish electronic API and Web Services interfaces for the federation.

15. The system of claim 14, wherein the electronic API and Web Services interfaces expose programmatic and data flow functions.

\* \* \* \* \*